United States Patent [19]
Ueshima et al.

[11] 3,855,308

[45] Dec. 17, 1974

[54] PROCESS FOR THE PREPARATION OF UNSATURATED CARBONYL COMPOUNDS

[75] Inventors: Michio Ueshima, Nishinomiya; Isao Yanagisawa, Ikeda; Masahiro Takata, Toyonaka; Michikazu Ninomiya, Kobe, all of Japan

[73] Assignee: Nippon Shokubai Kagaku Kogyo Co., Ltd., Osaka, Japan

[22] Filed: June 6, 1972

[21] Appl. No.: 260,222

[30] Foreign Application Priority Data
June 9, 1971 Japan.............................. 46-40128

[52] U.S. Cl. .......... 260/604 R, 252/469, 260/533 R
[51] Int. Cl. ............................................. C07c 45/04
[58] Field of Search ................................ 260/604 R

[56] References Cited
UNITED STATES PATENTS

| | | | |
|---|---|---|---|
| 2,627,527 | 2/1953 | Connolly et al................. | 260/604 R |
| 3,177,257 | 4/1965 | Detling et al. .................. | 260/604 R |
| 3,522,299 | 7/1970 | Takevaka et al............ | 260/604 R X |
| 3,679,603 | 7/1972 | Garnish et al................. | 260/604 R X |

*Primary Examiner*—Leon Zitver
*Assistant Examiner*—D. B. Springer
*Attorney, Agent, or Firm*—Sherman & Shalloway

[57] ABSTRACT

A process for the preparation of unsaturated carbonyl compounds which comprises carrying out the catalytic vapor phase oxidation of an olefin selected from the group consisting of propylene and isobutylene in the presence of a catalytic oxide in which the atomic ratio among the constituent catalytic elements, Co:Fe:Bi:W:Mo:Si:Tl:Z ranges 2.0–20.0 : 0.1–10.0 : 0.1–10.0 : 0.5–10.0 : 2.0–11.5 : 0.5–15.0 : 0.005–3.0 : 0–3.0, with the proviso that W plus Mo equals 12.0, and Z stands for a metal selected from the group consisting of alakali metals and alkaline earth metals.

10 Claims, No Drawings

3,855,308

PROCESS FOR THE PREPARATION OF UNSATURATED CARBONYL COMPOUNDS

This invention relates to a process for the preparation of unsaturated carbonyl compounds from olefins. More particularly, the invention relates to the catalytic vapor phase oxidation of propylene or isobutylene to form the corresponding unsaturated carbonyl compounds, i.e., respectively acrolein or methacrolein.

In the commercial production of unsaturated carbonyl compounds by the catalytic vapor phase oxidation of the corresponding olefins, it is generally true that the use of a catalyst which gives high conversion of olefins and shows high selectivity for the intended unsaturated carbonyl compounds is particularly important.

As the catalyst conventionally employed in the preparation of acrolein or methacrolein by the catalytic vapor phase oxidation of propylene or isobutylene, respectively, the catalytic oxide composed of oxygen, molybdenum, tellurium and either cadmium or zinc is recommended, for example, by the prior art disclosed in Japanese Official Patent Gazette, Publication No. 10605/68. Also, Japanese Patent, Publication No. 6245/69 teaches the use of the catalytic oxide composed of nickel, cobalt, iron, bismuth, molybdenum, phosphorus and oxygen and which is developed by adding nickel, cobalt and phosphorus to the catalytic oxide composed of iron, bismuth, molybdenum and oxygen. However, the per-pass yield of the unsaturated carbonyl compounds obtained through the action of these known catalysts are not quite fully satisfactory when considered from the standpoint of commercial production.

It is therefore an object of this invention to provide by the discovery of a new catalyst a process for the preparation of the unsaturated carbonyl compounds, which can be favorably employed in commercial production.

We have discovered that the above object of the invention can be accomplished by the use of a catalytic oxide which comprises cobalt, iron, bismuth, tungsten, molybdenum, silicon, thallium and oxygen, or a catalytic oxide comprising cobalt, iron, bismuth, tungsten, molybdenum, silicon, thallium, alkali metals or alkaline earth metals and oxygen, since in the presence of such a catalyst acrolein or methacrolein is obtained from propylene or isobutylene, respectively, with a very high per-pass yield.

The catalyst or catalytic oxide of the invention is characterized in that the catalytic elements constituting the same are present in the atomic ratios: Co:Fe:Bi:W:Mo:Si:Tl:Z = 2.0–20.0 : 0.1–10.0 : 0.1–10.0 : 0.5–10.0 : 2.0–11.5 : 0.5–15.0 : 0.005–3.0 : 0–3.0 (provided that W + Mo = 12.0, and Z stands for alkali metal and/or alkeline earth metal). Presumably, the oxygen is present in the catalyst in the form of complex metal oxide or metallic acid salt. Consequently, the oxygen content of the catalyst varies depending on the atomic ratios of the catalytic elements.

The oxides of the respective metals can be used as the starting material of the catalyst in the present invention. However, in the case of molybdenum and tungsten, the acid salts such as ammonium molybdate and ammonium tungstate are conveniently used. Further, in the case of the other metals, the use of the water-soluble salts such as nitrates and carbonates and hydroxides are also usually useable conveniently. On the other hand, as the compounds of alkali metals, the hydroxides and carbonates of sodium, potassium, cesium and lithium are suitably useable; and as the compounds of alkaline earth metals, the hydroxides and nitrates of calcium, magnesium, barium and strontium are conveniently useable.

The catalyst of the invention can be prepared through the steps of, for example, mixing the aqueous solutions of respectively ammonium molybdate and ammonium p-tungstate, adding to the mixture the aqueous solutions of respectively cobalt nitrate, ferric nitrate, bismuth nitrate and thallium nitrate, as well as the aqueous solution of a hydroxide or nitrate of an alkali metal or alkaline earth metal and subsequently coloidal silica as the silicon source, then adding a carrier, if necessary, followed by concentrating the system by evaporation, moulding the resulting clay-like substance and calcining the same at temperatures between 350 - 600°C., in a stream of air. Obviously, the starting materials of the catalyst are not limited to the foregoing ammonium salt, nitrates, hydroxides and carbonates, but various other compounds are equally useful so far as they can form the catalytic oxide upon calcination.

As the carrier, for example, silica gel, alumina, silicon carbide, diatomaceous earth, titanium dioxide and "Celite," etc. may be employed. Particularly preferred carriers are silica gel, titanium dioxide and "Celite."

The catalytic vapor phase oxidation in accordance with the invention is performed by introducing a gaseous mixture composed of 1 – 10 vol. % of propylene or isobutylene, 5 – 18 vol. % of molecular oxygen, 10 – 60 vol. % of steam and 20 – 70 vol. % of an inert gas, over the catalyst prepared at above, at temperatures ranging from 250° – 450°C. and pressures ranging from the normal pressure to 10 atmospheres. A suitable contact time ranges from 0.5 to 10.0 seconds. The reaction can be carried out either with a fixed bed or fluidized bed. By operating in the foregoing manner, results such as 92.5 – 98 mol % conversion of propylene or isobutylene, 85 – 92 mol % selectivity for acrolein and 78 – 84 mol % selectivity for methacrolein can be obtained. These achievements are markedly superior to those of the prior art.

Although the subject invention is not to be restricted by any theory, the excellent results of the invention process are presumably due to the appropriate adjustment of catalytic ability accomplished by the concurrent presence, in the catalytic oxide of the invention, of molybdates and tungstates of cobalt, iron, and bismuth, in addition to the oxides; as well as the presence of heteropolyacid compounds containing silicon, thallium, alkali metals and alkaline earth metals. Especially, the effects due to the presence of thallium and silicon are substantiated by the facts that the selectivities are markedly improved by the presence of thallium and that the conversion is improved by the presence of silicon, while retaining the high level of selectivities, as demonstrated in the hereinafter given Example 1 and Controls 1 and 2.

The terms, "conversion," "selectivity," and "per-pass yield," as used herein, are defined as follows:

Conversion (%) = Number of mols of olefin reacted/Number of mols of olefin supplied × 100

Selectivity (%) = Number of mols of unsaturated carbonyl compound formed/Number of mols of olefin reacted × 100 per-pass yield (%) Number of mols of unsaturated carbonyl compound formed/Number of mols of olefin supplied × 100

The invention will be more fully illustrated by reference to the following examples and control experiments, it being understood that the scope of this invention is by no means restricted thereby.

EXAMPLE 1

Seventy (70.0) g of cobalt nitrate was dissolved in 20 ml of distilled water, also 24.3 g of ferric nitrate was dissolved in 20 of distilled water, and 29.2 g of bismuth nitrate, was dissolved in 30 ml of distilled water which was made acidic with 6 ml of conc. nitric acid. Separately, into 300 ml of water, 106.2 g of ammonium molybdate and 32.4 g of ammonium p-tungstate were dissolved with heating and stirring. The foregoing three aqueous solutions of nitrates were added dropwise into the latter aqueous solution of ammonium salts, and further an aqueous solution formed by dissolving 0.801 g of thallium nitrate in 10 ml of distilled water and 24.4 g of 20% silica sol were added thereto. The so formed suspension was heated with stirring to cause the evaporation of the liquid component. The resulting solid was moulded and calcined at 450°C. for 6 hours in a stream of air to form the catalyst. The composition of the catalytic elements in terms of atomic ratio was as indicated below:

$Co_4 Fe_1 Bi_1 W_2 Mo_{10} Si_{1.35} Tl_{0.05}$

Sixty ml of the thus obtained catalyst was packed in a stainless steel U-shaped tube of 25 mm diameter. The tube was immersed in a molten nitrate bath heated at 300°C., and a gaseous mixture composed of 5 vol. % of propylene, 55 vol. % of air and 40 vol. % of steam was introduced into the tube and reacted with a contact time of 1.4 seconds. The results obtained are shown in Table 1.

CONTROL 1

Example 1 was repeated except that the addition of silica sol was omitted. The composition of the resulting catalyst in terms of atomic ratio was indicated below:

$Co_4 Fe_1 Bi_1 W_2 Mo_{10} Tl_{0.05}$

This catalyst was used and the reaction was carried out as in Example 1, with the results also shown in Table 1.

CONTROL 2

Example 1 was repeated except that the use of thallium nitrate was omitted. The composition of the catalyst in terms of atomic ratio was as follows:

$Co_4 Fe_1 Bi_1 W_2 Mo_{10} Si_{1.35}$

This catalyst was used and the reaction was carried out as in Example 1, with the results shown in Table 1.

Table 1

| | Composition of catalyst (atomic ratio) | | | | | | Reaction temperature (°C) | Propylene conversion (mol %) | Selectivity (mol %) | | Per-pass yield (mol %) | |
|---|---|---|---|---|---|---|---|---|---|---|---|---|
| | Co | Fe | Bi | W | Mo | Si | Tl | | | Acrolein | Acrylic acid | Acrolein | Acrylic acid |
| Example 1 | 4 | 1 | 1 | 2 | 10 | 1.35 | 0.05 | 300 | 97.5 | 91.5 | 6.0 | 89.2 | 5.9 |
| Control 1 | 4 | 1 | 1 | 2 | 10 | — | 0.05 | 300 | 84.0 | 93.0 | 2.5 | 78.1 | 2.1 |
| Control 2 | 4 | 1 | 1 | 2 | 10 | 1.35 | — | 300 | 81.0 | 77.0 | 6.6 | 62.4 | 5.4 |

EXAMPLE 2

The reaction was carried out by operating as in Example 1 using the catalyst used therein, except that the reaction temperature used was 330°C. and the contact time was 1 second.

The results obtained are as follows:

| Conversion of propylene | 96.0 mol % |
|---|---|
| Selectivity for acrolein | 91.0 mol % |
| Selectivity for acrylic acid | 5.8 mol % |

EXAMPLE 3

The reaction was carried out as in Example 1 using the catalyst used therein, a reaction temperature of 300°C., a contact time of 1.4 seconds, and as the reactant gas a gas mixture composed of 7 vol. % of propylene, 63 vol. % of air and 30 vol. % of steam. The results obtained are as follows:

| Conversion of propylene | 97.6 mol % |
|---|---|
| Selectivity for acrolein | 89.0 mol % |
| Selectivity for acrylic acid | 7.1 mol % |

EXAMPLES 4 – 8

Catalysts of the compositions shown in Table 2 were prepared by operating as in Example 1. In the case of Example 6, 20 weight %, based on the catalyst, of silica gel was used as a carrier, however.

These catalysts were used and by operating as in Example 1 the oxidation of propylene was carried out at the reaction temperatures indicated in Table 2, with the results shown therein.

EXAMPLE 9 – 14

Catalysts having the compositions shown in Table 2 were prepared by operating as in Example 1 except that as the starting material of the catalyst the hydroxides or nitrates of alkali metals and/or alkaline earth metals were used in addition to the compounds used in Example 1. In the case of Example 9, 30 weight %, based on the catalyst, of titanium dioxide was used as a carrier.

These catalysts were used and by operating as in Example 1 the oxidation of propylene was carried out at the reaction temperatures indicated in Table 2, with the results shown therein.

Table 2

| Example No. | Composition of catalyst (atomic ratio) | | | | | | | Alkali metal | Alkali earth metal | Reaction temperature (°C.) | Propylene conversion (mol %) | Selectivity (mol %) | | Per-pass yield (mol %) | |
|---|---|---|---|---|---|---|---|---|---|---|---|---|---|---|---|
| | Co | Fe | Bi | W | Mo | Si | Tl | | | | | Acrolein | Acrylic acid | Acrolein | Acrylic acid |
| 4 | 4 | 1 | 1 | 2 | 10 | 1.35 | 0.08 | — | — | 300 | 96.5 | 92.1 | 5.0 | 88.9 | 4.8 |
| 5 | 4 | 1 | 1 | 3 | 9 | 2.0 | 0.10 | — | — | 295 | 97.0 | 91.5 | 5.7 | 88.8 | 5.5 |
| 6 | 5 | 1 | 2 | 1 | 11 | 1.1 | 0.05 | — | — | 310 | 98.2 | 87.0 | 7.5 | 85.4 | 7.4 |
| 7 | 4 | 0.5 | 1 | 1 | 11 | 1.5 | 0.05 | — | — | 290 | 97.5 | 90.8 | 6.8 | 88.5 | 6.6 |
| 8 | 4 | 2.0 | 1 | 2 | 10 | 1.0 | 0.05 | — | — | 320 | 98.0 | 88.0 | 7.1 | 86.2 | 7.0 |
| 9 | 4 | 1 | 1 | 2 | 10 | 1.35 | 0.03 | Na 0.05 | — | 305 | 97.5 | 86.5 | 8.0 | 84.3 | 7.8 |
| 10 | 4 | 1 | 1 | 2 | 10 | 1.35 | 0.03 | K 0.03 | — | 315 | 97.0 | 88.0 | 6.2 | 85.4 | 6.0 |
| 11 | 4 | 1 | 1 | 2 | 10 | 1.35 | 0.03 | — | Mg 0.05 | 300 | 97.2 | 86.8 | 7.5 | 84.4 | 7.3 |
| 12 | 4 | 1 | 1 | 2 | 10 | 1.35 | 0.03 | — | Ca 0.05 | 305 | 96.5 | 87.0 | 6.8 | 84.0 | 6.6 |
| 13 | 4 | 1 | 1 | 2 | 10 | 1.35 | 0.03 | Na 0.03 | Mg 0.03 | 300 | 98.2 | 85.9 | 8.2 | 84.4 | 8.1 |
| 14 | 4 | 1 | 1 | 2 | 10 | 1.35 | 0.03 | K 0.02 | Ca 0.05 | 310 | 97.5 | 87.5 | 7.6 | 85.3 | 7.4 |

EXAMPLE 15 – 18

Catalysts of various compositions as shown in Table 3 were prepared as in Example 1 and Examples 9 – 14.

Sixty ml of each of these catalysts was packed in a stainless steel U-shaped tube of 25 mm diameter, and the tube was immersed in a molten nitrate bath heated at 310°C., following which a gaseous mixture composed of 5 vol. % of isobutylene, 55 vol. % of air, and 40 vol. % of steam was introduced and reacted with a contact time of 1.8 seconds. The results obtained are shown in Table 3.

Table 3

| Example No. | Composition of catalyst (atomic ratio) | | | | | | | | Isobutylene conversion (mol %) | Methacrolein selectivity (mol %) | Methacrolein per-pass yield (mol %) |
|---|---|---|---|---|---|---|---|---|---|---|---|
| | Co | Fe | Bi | W | Mo | Si | Tl | Z | | | |
| 15 | 4 | 1 | 1 | 2 | 10 | 1.35 | 0.3 | — | 93.0 | 81.5 | 75.8 |
| 16 | 6 | 1 | 1 | 2 | 10 | 1.35 | 1.0 | — | 92.5 | 84.0 | 77.6 |
| 17 | 4 | 1 | 1 | 2 | 10 | 1.35 | 0.2 | Na 0.1 | 94.0 | 79.8 | 75.0 |
| 18 | 4 | 1 | 1 | 2 | 10 | 1.35 | 0.2 | Ca 0.1 | 95.0 | 78.7 | 74.8 |

We claim:

1. A process for the preparation of unsaturated carbonyl compounds which comprises carrying out the catalytic vapor phase oxidation of an olefin selected from the group consisting of propylene and isobutylene, in the presence of molecular oxygen, and in the presence of a catalytic oxide in which the atomic ratio among the constituent catalytic elements, Co:Fe:Bi:W:Mo:Si:Tl:Z ranges 2.0–20.0 : 0.1–10.0 : 0.1–10.0 : 0.5–10.0 : 2.0–11.5 : 0.5–15.0 : 0.005–3.0 : 0 – 3.0, with the proviso that W plus Mo equals 12.0, and Z stands for a metal selected from the group consisting of the alkali metals and alkaline earth metals, at temperatures ranging from 250° to 450°C. and pressures ranging from normal pressure to 10 atmospheres.

2. The process of claim 1 in which acrolein is prepared by using propylene.

3. The process of claim 1 in which methacrolein is prepared by using isobutylene.

4. The process of claim 1 in which the oxidation is performed on a gaseous mixture of 1 to 10 volume percent of propylene or isobutylene, 5 to 18 volume percent of molecular oxygen, 10 to 60 volume percent of steam, and 20 to 70 volume percent of an inert gas.

5. The process of claim 1 in which the catalytic oxidation contact time is from 0.5 to 10.0 seconds.

6. A process for the preparation of unsaturated carbonyl compounds which comprises carrying out the catalytic vapor phase oxidation of an olefin selected from the group consisting of propylene and isobutylene, in the presence of molecular oxygen and in the presence of a catalytic oxide in which the atomic ratio among the constituent catalytic elements, Co:Fe:Bi:W:Mo:Si:Tl ranges 2.0–20.0 : 0.1–10.0 : 0.1–10.0 : 0.5–10.0 : 2.0–11.5 : 0.5–15.0 : 0.005–3.0, with the proviso that W plus Mo equals 12.0, at temperatures ranging from 250° to 450°C. and pressures ranging from normal pressure to 10 atmospheres.

7. The process of claim 6 in which acrolein is prepared by using propylene.

8. The process of claim 6 in which methacrolein is prepared by using isobutylene.

9. The process of claim 6 in which the oxidation is performed on a gaseous mixture of 1 to 10 volume percent of propylene or isobutylene, 5 to 18 volume percent of molecular oxygen, 10 to 60 volume percent of steam, and 20 to 70 volume percent of an inert gas.

10. The process of claim 6 in which the catalytic oxidation contact time is from 0.5 to 10.0 seconds.

* * * * *